United States Patent
Camhi et al.

(10) Patent No.: US 7,950,902 B2
(45) Date of Patent: May 31, 2011

(54) COOLING CHANNEL FORMED IN A WALL

(75) Inventors: Emmanuel Pierre Camhi, Fuveau (FR); Laurent Crouilbois, Brunoy (FR); Jean Pierre Mareix, Chartrettes (FR); Didier Pasquiet, Boissise le Roi (FR)

(73) Assignee: SNECMA, Paris (FR)

( * ) Notice: Subject to any disclaimer, the term of this patent is extended or adjusted under 35 U.S.C. 154(b) by 1312 days.

(21) Appl. No.: 11/492,110

(22) Filed: Jul. 25, 2006

(65) Prior Publication Data

US 2007/0025852 A1  Feb. 1, 2007

(30) Foreign Application Priority Data

Jul. 26, 2005 (FR) ................................. 05 07924
Jan. 12, 2006 (FR) ................................. 06 50103

(51) Int. Cl.
F01D 5/18 (2006.01)
(52) U.S. Cl. .................................................. 416/97 R
(58) Field of Classification Search ............. 416/95, 416/96 R, 97 R
See application file for complete search history.

(56) References Cited

U.S. PATENT DOCUMENTS

| | | | |
|---|---|---|---|
| 4,197,443 A | 4/1980 | Sidenstick | |
| 4,650,949 A * | 3/1987 | Field | 219/69.15 |
| 4,653,983 A | 3/1987 | Vehr | |
| 4,664,597 A | 5/1987 | Auxier et al. | |
| 4,672,727 A | 6/1987 | Field | |
| 4,684,323 A * | 8/1987 | Field | 416/97 R |
| 4,738,588 A | 4/1988 | Field | |
| 4,762,464 A | 8/1988 | Vertz et al. | |
| 4,819,325 A | 4/1989 | Cross et al. | |
| 5,043,553 A * | 8/1991 | Corfe et al. | 219/121.7 |
| 5,368,441 A | 11/1994 | Sylvestro et al. | |
| 5,609,779 A * | 3/1997 | Crow et al. | 219/121.71 |
| 5,683,600 A * | 11/1997 | Kelley et al. | 219/121.71 |
| 6,183,199 B1 | 2/2001 | Beeck et al. | |

(Continued)

FOREIGN PATENT DOCUMENTS

EP  0 267 718 A2  5/1988

(Continued)

OTHER PUBLICATIONS

"Zuckerhut (Lebensmittel)" aus Wikipedia, der freien Enzyklopadie (2 Seiten), Aug. 18, 2009.

(Continued)

*Primary Examiner* — Justine R. Yu
*Assistant Examiner* — Sean J Younger
(74) *Attorney, Agent, or Firm* — Oblon, Spivak, McClelland, Maier & Neustadt, L.L.P.

(57) ABSTRACT

A wall in which there is formed at least one cooling channel, said wall being cooled by cool air flowing in the channel, the channel comprising a hole and a diffusion portion, the hole opening out at one end into the inside surface of the wall, and at its other end into the diffusion portion where it forms an orifice, the diffusion portion flaring around said orifice and opening out into the outside surface of the wall, the diffusion portion having a bottom whose front end is substantially plane, sloping, and extending in front of the orifice, and also having a margin extending behind, round the sides, and in front of the orifice, said margin joining the sides of the front end. A method and an electrode for making such a cooling channel. A turbomachine blade presenting such a wall.

11 Claims, 2 Drawing Sheets

U.S. PATENT DOCUMENTS

| | | | |
|---|---|---|---|
| 6,206,638 B1 | 3/2001 | Glynn et al. | |
| 6,287,075 B1 * | 9/2001 | Kercher | 416/97 R |
| 6,307,175 B1 * | 10/2001 | Blochlinger et al. | 219/121.71 |
| 6,368,060 B1 * | 4/2002 | Fehrenbach et al. | 416/97 R |
| 6,573,474 B1 * | 6/2003 | Loringer | 219/121.71 |
| 6,630,645 B2 * | 10/2003 | Richter et al. | 219/121.71 |
| 6,759,621 B2 | 7/2004 | Varin | |
| 6,897,401 B2 * | 5/2005 | Kildea | 219/69.17 |
| 6,994,514 B2 * | 2/2006 | Soechting et al. | 415/115 |
| 7,019,257 B2 * | 3/2006 | Stevens | 219/121.71 |
| 7,041,933 B2 * | 5/2006 | Forrester et al. | 219/69.17 |
| 2002/0187039 A1 | 12/2002 | Rinck et al. | |

FOREIGN PATENT DOCUMENTS

| | | |
|---|---|---|
| EP | 1 228 832 A1 | 8/2002 |
| EP | 1 517 003 A2 | 3/2005 |
| JP | 2000-064806 | 2/2000 |
| JP | 2000-141069 | 5/2000 |
| JP | 2000-141069 A | 5/2000 |
| JP | 2005-090511 | 4/2005 |

OTHER PUBLICATIONS

Official Action in corresponding Japanese Patent Application No. 2006-200296 dated Jan. 11, 2011.

* cited by examiner

COOLING CHANNEL FORMED IN A WALL

The invention relates to a method of forming a cooling channel in a wall, to an electrode used for implementing the method, to a wall element in which a cooling channel is formed, and to a hollow turbomachine blade including a wall element of this type.

FIELD OF THE INVENTION

More precisely, the invention relates to a wall element of the type comprising an inside surface and an outside surface, the outside surface being suitable for being cooled by cool air flowing in said cooling channel. In addition, the cooling channel is of the type comprising a hole and a diffusion portion, the hole opening out at one end into the inside surface of the wall and at its other end substantially into the bottom of the diffusion portion by forming an orifice, and the diffusion portion flaring away from said orifice and opening out into the outside surface of the wall.

BACKGROUND OF THE INVENTION

U.S. Pat. No. 6,183,199 B1 shows an example of a wall element for a hollow blade of a turbojet turbine, the element being pierced by a cooling channel of the above-specified type. In that example, the hole of the channel and its diffusion portion are made by electro-erosion in a single step, using a single electrode whose tip presents a front portion of a shape that corresponds to that of the hole and a rear portion of a shape corresponding to that of the diffusion portion of the channel.

An electrode of that type is described and shown in U.S. Pat. No. 4,197,443 to which reference is made in U.S. Pat. No. 6,183,199 B1. As can be seen, the shape of that electrode is particularly complex. In addition, in general manner, forming a channel by electroerosion using known methods remains an operation that is lengthy and expensive.

OBJECTS AND SUMMARY OF THE INVENTION

An object of the invention is thus to provide an alternative to known methods, making it possible to form a cooling channel of the above-specified type, more quickly and at lower cost.

To achieve this object, the invention provides a method wherein said wall is pierced to make said hole, and wherein an indentation is formed in said wall in order to form said diffusion portion, in two distinct steps.

In the method of the invention, it is thus possible to use techniques and materials that are different for making the hole and for making the diffusion portion.

To make the hole, it is possible to pierce the wall by electroerosion or by using a laser.

Advantageously, laser piercing techniques are used, since these techniques are much faster and much less expensive than electroerosion techniques. Thus, to pierce a wall of a hollow turbine blade by laser, generally only a few tenths of a second are required.

Nevertheless, if it is desired to perform the piercing and the diffusion portion by electroerosion, then two different electrodes are used for each of said portions. The electrodes are simpler in shape than the electrodes that have been used in the past, so they are easier and less expensive to make. For example, for the piercing, it is possible to use an electrode that is cylindrical.

According to another aspect of the invention, in order to make the diffusion portion, an electrode is used in which the tip of the electrode is in the form of a cone with a rounded end and with a conical side surface that presents a flat, the axis of the cone not intersecting the flat.

The above-specified shape for the electrode makes it possible firstly to avoid creating a sharp angle in the bottom of the diffusion portion, where sharp angles generally constitute starter zones for cracks.

Secondly, an electrode of that shape and of appropriate dimensions relative to the hole makes it possible to form a diffusion portion of a shape that is sufficiently broad and flared to ensure that, given the tolerances involved in making the hole and the diffusion portion, and regardless of the position of the hole relative to the diffusion portion, the diffusion portion provides good diffusion (i.e. good guidance and good spreading) of the stream of air leaving the hole.

The invention also provides a wall element having a new type of cooling channel formed therein. Such a channel may be obtained using the method and the electrode of the invention.

The channel includes a diffusion portion with a bottom whose front end is substantially flat, sloping in the thickness of the wall and extending in front of the orifice in the flow direction of the cool air, and a rearwardly-extending margin on the sides and at the front of the orifice, said margin joining the sides of the front end of the bottom.

Advantageously, the angle formed between the margin and the front end of the bottom in a plane perpendicular to the bottom is not "sharp" in the sense that it is strictly greater than 90°. This avoids creating crack-starter zones.

Finally, the invention provides a hollow gas-turbine blade including a wall element of the above-specified type.

BRIEF DESCRIPTION OF THE DRAWINGS

The invention and its advantages can be better understood on reading the following detailed description. The description refers to the accompanying figures, in which.

MORE DETAILED DESCRIPTION

Figure 1:
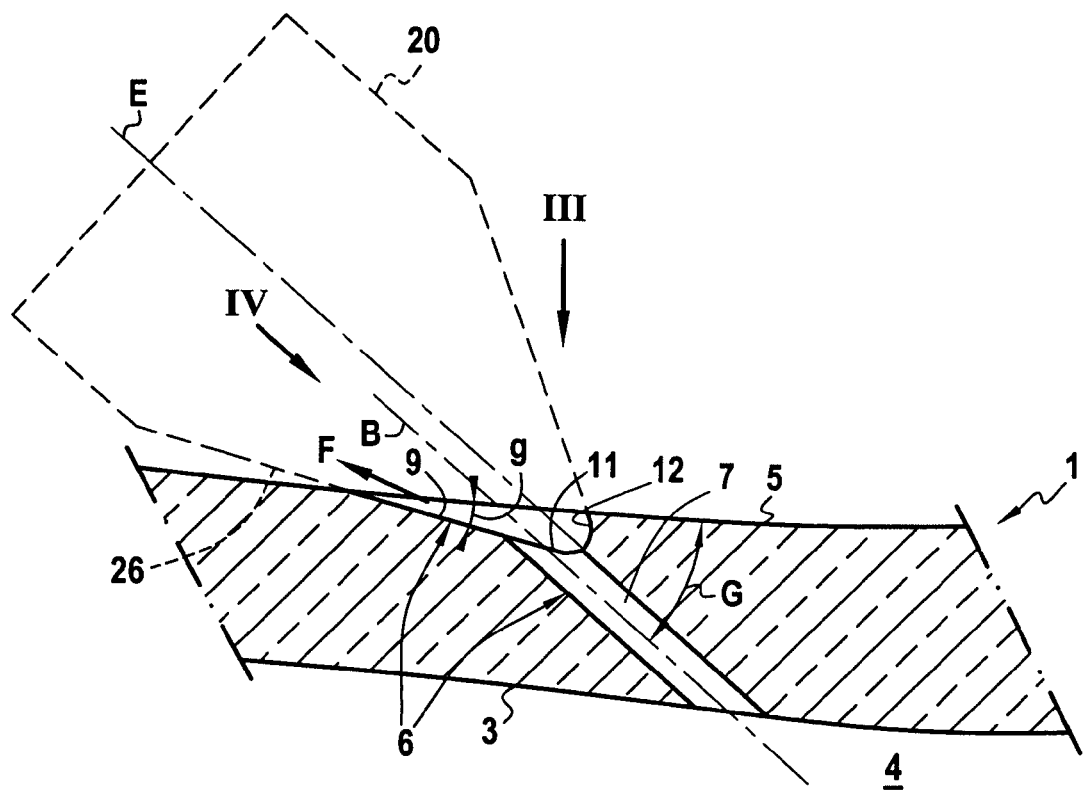
FIG. 1 is a section showing an example of a wall element of the invention including a cooling channel.

With reference to FIGS. 1, 3, 4, and 5, there follows a description of an example of a wall element of the invention.

Said wall element presents an inside surface 3 and an outside surface 5. This element belongs to a wall 1 of a hollow gas-turbine blade, such as a high pressure turbine blade of a turbojet. This type of hollow blade has an internal cooling passage 4 defined in part by the inside surface 3, said passage being fed with cool air.

The outside surface 5 of the wall is subjected to the hot gas passing through the turbine and it therefore needs to be cooled. For this purpose, cooling channels are provided in the wall 1. At least some of these channels are of the same type as the channel shown in FIG. 1. This channel 6 passes cool air coming from the internal cooling passage 4 of the blade and delivers this cool air to the outside surface 5 in order to cool it. The channel 6 comprises two portions: an adjustment portion formed by a hole 7, and a diffusion portion 9 formed by an indentation formed in the wall 1 in its outside surface 5.

The hole is said to be an adjustment portion since the minimum section of the hole 7 serves to adjust the rate at which air flows along the channel 6. Advantageously, the hole 7 is simple in shape. In the example shown, the hole 7 is inscribed in a circular cylinder. In addition, the axis B of the hole 7 is inclined at an angle G relative to the outside surface 5 (or if this surface 5 is not plane, relative to the tangent thereto on the axis B). The angle G is less than 90°, and preferably lies in the range 15° to 80°, so as to direct the stream of air F towards the outside surface 5 so that it remains as close as possible thereto. In other words, it is desired to make the velocity vectors of the air stream F at the outlet from the channel 6 as nearly parallel as possible to the plane of the outside surface 5.

In order to direct the stream of air F better against the outside surface 5 and in order to spread this stream of air F in the plane of the outside surface 5, the channel 6 presents a diffusion portion 9 following the hole 7. This diffusion portion 9 flares around the orifice 11 through which the cool air leaves the hole 7. This orifice 11 is situated preferably substantially in the bottom of the diffusion portion 9 relative to the outside surface 5. In front of the orifice, in the flow direction of the stream F, the diffusion portion 9 has a bottom whose front end 13 is substantially plane, sloping in the thickness of the wall at an angle g relative to the outside surface 5. The angle g preferably lies in the range 2° to 45°, and in any event it is smaller than the angle G so that the stream of air F, as guided by the front end 13 of the bottom is directed towards the outside surface 5.

The front end 13 of the bottom encourages the stream of cool air F leaving the hole 7 to come close to the outside surface 5. This air stream thus remains in contact with the outside surface 5, thus making it possible firstly to cool the surface 5 by heat exchange and secondly to create a protective film of air on said surface 5 that keeps the hot gas of the medium in which the wall 1 is situated at a distance from said surface 5.

Advantageously, the outline of the front end 13 of the bottom is generally triangular in shape, having one of its vertices pointing towards said orifice 11 (see FIGS. 3 and 4), thus enabling the air stream F leaving the hole 7 to be spread, and thus cooling and protecting a larger portion of the outside surface 5. Naturally, the base remote from said vertex is wider than the orifice 11, so as to widen the air stream F.

At the rear end, on the sides and in front of the orifice 11, there is a margin 15. The margin 15 goes around the orifice 11 in part and towards the front it joins the sides of the front end 13 of the bottom.

Figure 5:
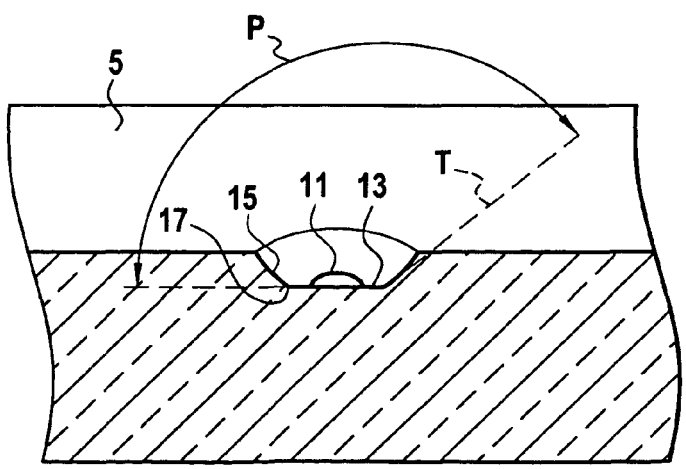
FIG. 5 is a section view on plane V-V of FIG. 3.

In the example shown in FIG. 5, the junction zones between the margin 15 and the front end 13 present edges 17. The angle P formed in these edges between the margin 15 and the front end 13 itself, in a plane perpendicular to the front end 13, is strictly greater than 90° so as to avoid weakening the wall element 1. The angle P is measured between the tangent T to the margin 15 at the edge 17, and the front end 13 of the bottom, as shown in FIG. 5.

It is also possible to provide rounding in each junction zone in order to avoid creating any edges. Under such circumstances, the angle P is measured between the general direction of the margin 15 and the front end 13 of the bottom.

In the example of FIG. 1, the rear portion of the margin 15 flares rearwards from the orifice 11 and then presents a forwardly-directed lip 12 in the outside surface 5. This lip 12 helps guide the stream of cool air forwards.

Figure 4:
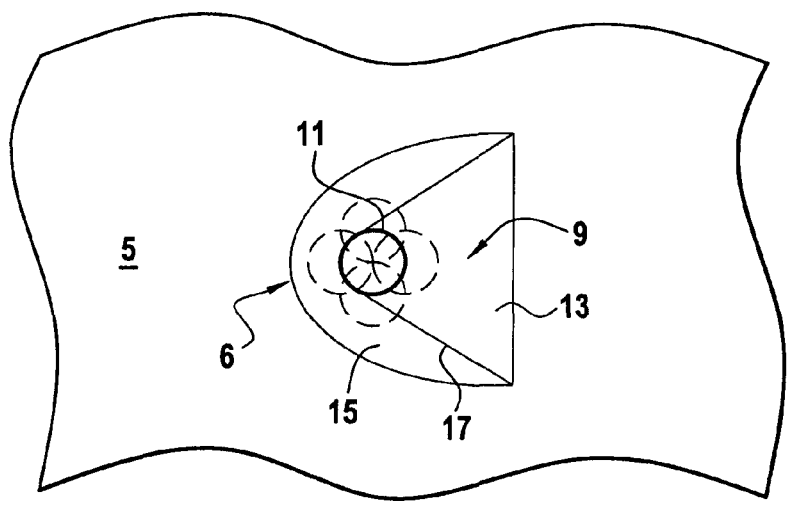
FIG. 4 is a view of the FIG. 1 channel seen looking along the direction IV, i.e. along the piercing axis of the channel.

The front end 13 of the bottom and the margin 15 are inscribed in a cone 23 having a rounded end 24 and a conical surface 25 that presents a flat 26. The front end 13 of the bottom corresponds to the flat 26, and as can be seen in FIGS. 1 and 4, the margin 15 corresponds essentially in its rear portion with the rounded end 24 of the cone 23, and in its side and front portions with the conical surface portions 25 adjacent to the flat 26. Advantageously, the axis E of the cone 23 and the axis B of the hole 7 are parallel, with the axis B preferably being offset towards the outside surface 5, as shown in FIG. 1.

With the shape of the cooling channel 6 in the wall element 1 described fully above, there follows a description of an implementation of the method of, the invention enabling a channel of this type to be formed.

In a first step of the method, the wall 1 is pierced by means of a laser. Laser piercing techniques are known to the person skilled in the art and they present the advantage of being fast and less expensive than electro-erosion techniques.

Then, in a second step, the recess corresponding to the diffusion portion 9 is formed in the wall 1 in its outside surface 5 by electroerosion. Naturally, this second step could be undertaken before the first.

Figure 2:
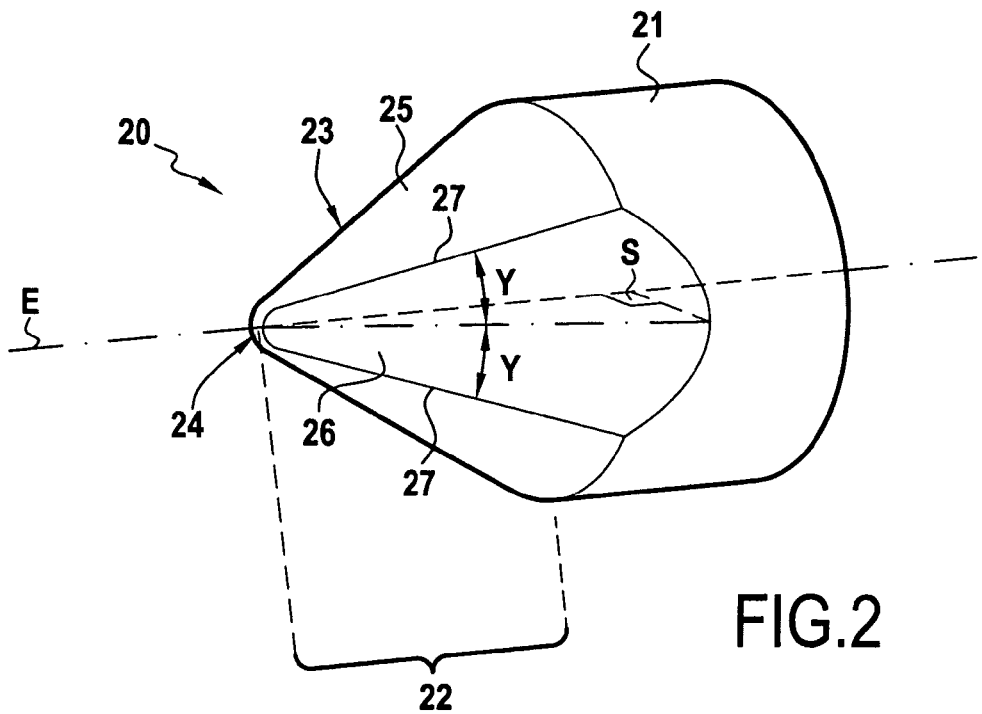
FIG. 2 is a perspective view of the tip of the electrode used for making the diffusion portion of the FIG. 1 channel.
Figure 3:
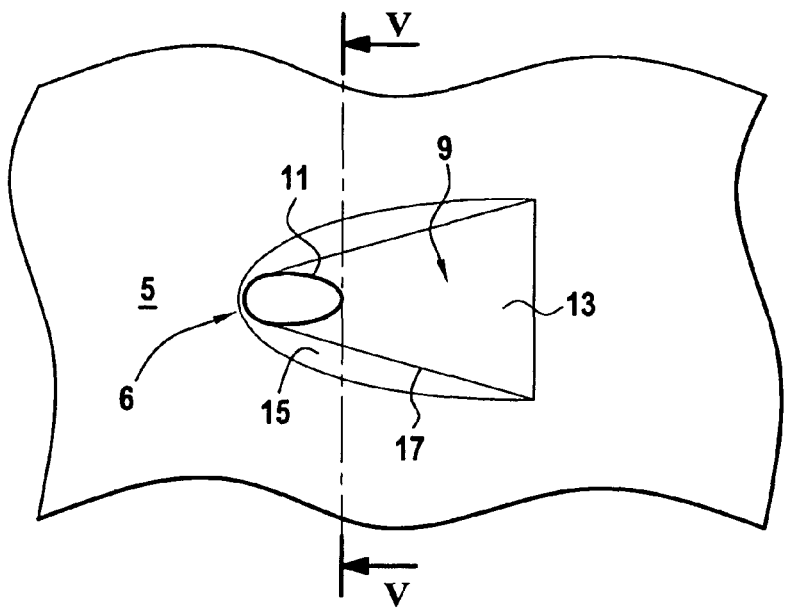
FIG. 3 is a plan view of the FIG. 1 channel seen looking along the direction III that is orthogonal to the outside surface of the wall.

For this second step, an electrode 20 is used that is of the type shown in FIG. 2. The body of the electrode 21 is cylindrical while the tip 22 of the electrode is in the form of a cone 23 having a rounded end 24 and including a flat 26 in its lateral conical surface 25. The flat 26 extends on one side of the cone 23 from a point in the vicinity of the end 24 to the portion of the cone 23 where it is at its greatest flare, and beyond. The axis E of the cone 23 does not intersect the flat 26: the flat therefore does not intersect the end vertex 24 of the cone 23. The cone 23 is symmetrical about a plane of symmetry S perpendicular to the flat 26 and containing the axis E of the cone 23. The half-angles Y of the flare defined between the side edges 27 of the flat and the plane S lie in the range 10° to 30°, and are preferably close to 15°.

As shown in FIG. 1, the indentation corresponding to the diffusion portion 9 is formed by electroerosion, by pushing the tip 22 of the electrode 20 into the wall 1 via its outside surface 5, the flat 26 being positioned to face said outside surface 5. Advantageously, during this operation, the axis E of the cone 23 is oriented so as to be parallel to the axis B of the hole 7, with these axes preferably being offset so that the axis B is the closer to the wall 1.

It should be observed that the presence and the size of the lip 12 of the margin 15 (i.e. the extent to which it extends rearwards) depends on the radius of the curvature of the end 24 and on the depth to which the electrode 20 is pushed in.

In general, when forming the indentation, the following are selected: the shape of the electrode 21 and more particularly the shape of the cone 23, the radius of the curvature of the rounded end 24 and the position of the flat 26 (half-angles Y of the flare); the position of the electrode, and more particularly the orientation of the axis E of the cone 23 relative to the axis B of the hole 7; and the penetration depth of the electrode 20 into the wall 1; so as to form the front end 13 of the bottom in front of the orifice 11 and a flared margin 15 behind and on the side of the orifice 11 that meet the sides of the front end 13 where they form two edges 17. These edges are sufficiently rounded to avoid creating zones of weakness (see FIG. 5).

The presence of the rear margin 15 enables the diffusion portion 9 to be made with a certain amount of tolerance relative to the hole 7. This is shown in FIG. 4 where dashed lines show various positions that the orifice 11 could occupy relative to the diffusion portion 9. As can be seen, in all the examples shown, the orifice 11 opens out completely into the diffusion portion 9 at a position such that the cool air stream is guided by the diffusion portion 9, thereby guaranteeing proper cooling of the outside surface 5. Naturally, better diffusion is obtained when the orifice 11 opens out substantially into the bottom of the diffusion portion 9, as shown in continuous lines.

What is claimed is:

1. A wall element in which at least one cooling channel is formed, said wall element comprising:
    an inside surface and an outside surface cooled by cool air flowing along said channel,
    wherein the channel includes a hole and a diffusion portion, the hole opening out at one end thereof in the inside surface, and at an other end in the diffusion portion where the hole forms an orifice, the diffusion portion flaring around said orifice and opening out in the outside surface,
    wherein a front end of a bottom of the diffusion portion is substantially planar, slopes in a thickness of the wall, extends forwards from the orifice in a cool air flow direction,
    wherein the diffusion portion includes a margin extending behind the orifice, along sides of the diffusion portion, and in front of the orifice, said margin joining the sides of the front end of the bottom of the diffusion portion, and
    wherein the margin and the front end of the bottom of the diffusion portion are inscribed in a cone having a rounded end and a conical surface that includes a flat portion.

2. A wall element according to claim 1, wherein an outline of the front end of the bottom of the diffusion portion is in the form of a triangle with one vertex of the triangle pointing towards said orifice so as to widen the cool air flow leaving the hole.

3. A wall element according to claim 1, wherein an angle formed between the margin and the front end of the bottom of the diffusion portion in a plane perpendicular to the front end is greater than 90°.

4. A wall element according to claim 1, wherein an axis of said cone is parallel to the axis of the hole.

5. A hollow turbomachine blade including a wall element in which at least one cooling channel is formed, said wall element comprising:
    an inside surface and an outside surface suitable for being cooled by cool air flowing along said channel,
    wherein the channel includes a hole and a diffusion portion, the hole opening out at one end thereof in the inside surface, and at an other end in the diffusion portion where the hole forms an orifice, the diffusion portion flaring around said orifice and opening out in the outside surface,
    wherein a front end of a bottom of the diffusion portion is substantially planar, slopes in a thickness of the wall, extends forwards from the orifice in a cool air flow direction,
    wherein the diffusion portion includes a margin extending behind the orifice, along sides of the diffusion portion, and in front of the orifice, said margin joining the sides of the front end of the bottom of the diffusion portion, and
    wherein the margin and the front end of the bottom of the diffusion portion are inscribed in a cone having a rounded end and a conical surface that includes a flat portion.

6. A turbomachine including a hollow blade having a wall element in which at least one cooling channel is formed, said wall element comprising:
    an inside surface and an outside surface suitable for being cooled by cool air flowing along said channel,
    wherein the channel includes a hole and a diffusion portion, the hole opening out at one end thereof in the inside surface, and at an other end in the diffusion portion where the hole forms an orifice, the diffusion portion flaring around said orifice and opening out in the outside surface,
    wherein a front end of a bottom of the diffusion portion is substantially planar, slopes in a thickness of the wall, extends forwards from the orifice in a cool air flow direction,
    wherein the diffusion portion includes a margin extending behind the orifice, along sides of the diffusion portion, and in front of the orifice, said margin joining the sides of the front end of the bottom of the diffusion portion, and
    wherein the margin and the front end of the bottom of the diffusion portion are inscribed in a cone having a rounded end and a conical surface that includes a flat portion.

7. A wall element according to claim 4, wherein the axis of the hole is offset towards the outside surface of the wall.

8. A wall element according to claim 1, wherein an angle between an axis of the hole and the outside surface is less than 90°.

9. A wall element according to claim 8, wherein the angle is between 15° and 80°.

10. A wall element according to claim 1, wherein the flat portion is formed at angle between 2° and 45° relative to the outside surface.

11. A wall element according to claim 1, wherein an angle between an axis of the hole and the outside surface is greater than an angle between the outside surface and the flat portion.

* * * * *